United States Patent
Burton et al.

(10) Patent No.: US 12,309,909 B2
(45) Date of Patent: May 20, 2025

(54) MAGNETOPLASMADYNAMIC THRUSTER WITH REVERSE POLARITY AND TAILORED MASS FLUX

(71) Applicant: CU Aerospace, LLC, Champaign, IL (US)

(72) Inventors: Rodney Lane Burton, Northbrook, IL (US); David L. Carroll, Champaign, IL (US); Joseph William Zimmerman, Champaign, IL (US)

(73) Assignee: CU Aerospace, LLC, Champaign, IL (US)

( * ) Notice: Subject to any disclaimer, the term of this patent is extended or adjusted under 35 U.S.C. 154(b) by 45 days.

(21) Appl. No.: 18/332,533

(22) Filed: Jun. 9, 2023

(65) Prior Publication Data

US 2023/0413414 A1    Dec. 21, 2023

Related U.S. Application Data

(60) Provisional application No. 63/350,882, filed on Jun. 10, 2022.

(51) Int. Cl.
*H05H 1/54* (2006.01)
*B64G 1/40* (2006.01)

(52) U.S. Cl.
CPC ............... *H05H 1/54* (2013.01); *B64G 1/413* (2023.08)

(58) Field of Classification Search
CPC .................................. H05H 1/54; B64G 1/413
See application file for complete search history.

(56) References Cited

U.S. PATENT DOCUMENTS

| | | | | |
|---|---|---|---|---|
| 3,150,483 A * | 9/1964 | Mayfield | ................... | F03H 1/00 310/11 |
| 4,682,564 A * | 7/1987 | Cann | ........................ | H05H 1/54 118/721 |
| 5,357,747 A * | 10/1994 | Myers | ................... | F03H 1/0081 313/341 |
| 6,295,804 B1 * | 10/2001 | Burton | ...................... | F03H 1/00 60/202 |
| 2020/0032777 A1 | 1/2020 | Woodruff et al. | | |
| 2022/0106944 A1 * | 4/2022 | Woodruff | .............. | F03H 1/0087 |

OTHER PUBLICATIONS

PCT/US2024/032785, Oct. 2, 2024, PCT International Search Report.

* cited by examiner

*Primary Examiner* — David P. Olynick

(74) *Attorney, Agent, or Firm* — Adam K. Sacharoff; Much Shelist, P.C.

(57) ABSTRACT

The MPD thruster improvements described here apply to coaxial gas-fed quasisteady self-field devices without auxiliary magnetic fields.

8 Claims, 3 Drawing Sheets

Reverse Polarity MPD Thruster Schematic

Reverse polarity self-field Magnetoplasmadynamic thruster with 1/r² mass flux distribution with injector ports Reverse polarity self-field magnetoplasmadynamic thruster with $1/r^2$ mass flux distribution Reverse polarity self-field Magnetoplasmadynamic thruster with $1/r^2$ mass flux distribution with injector ports

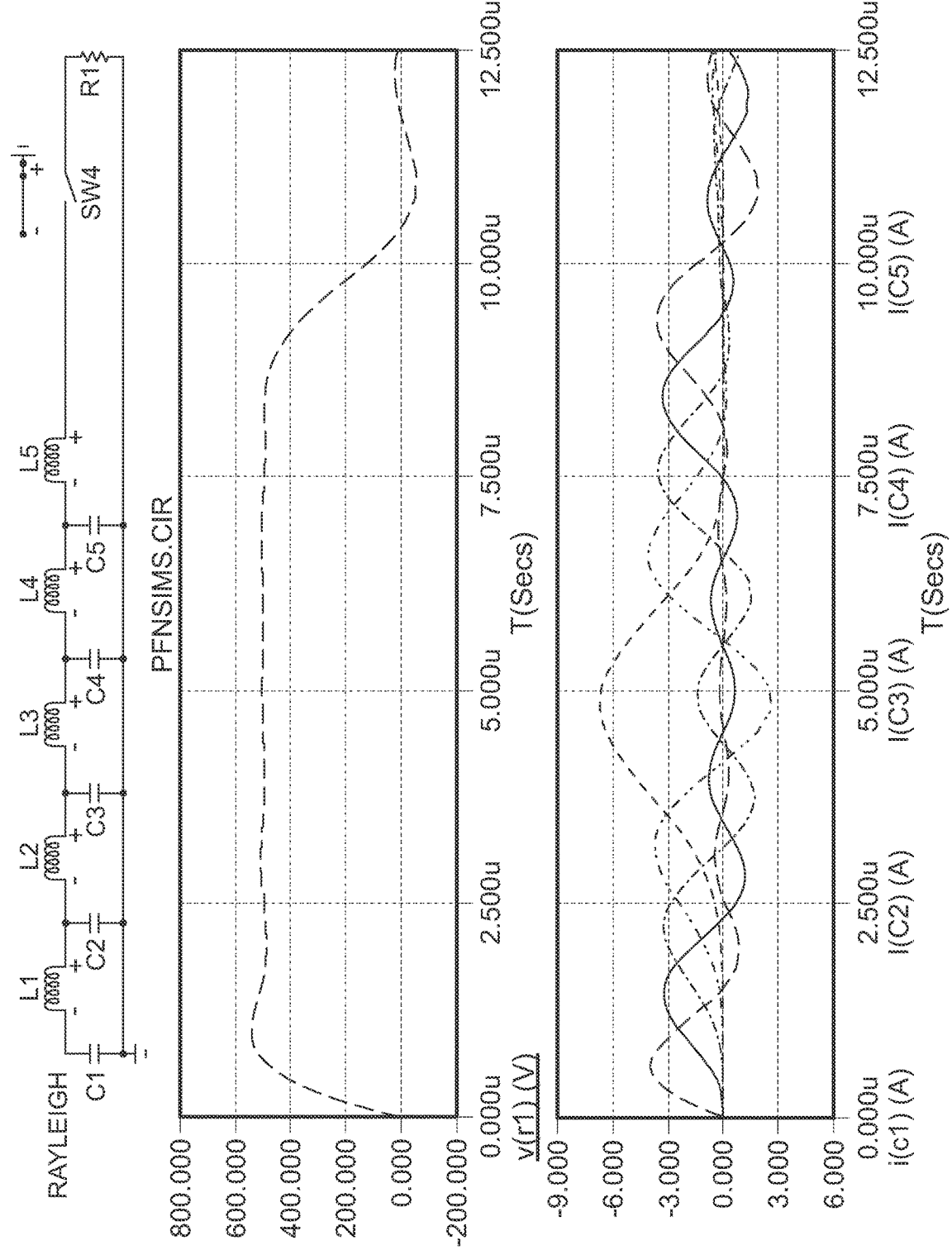
Five-section Rayleigh Line PFN showing the network, load current, and capacitor currents. FIG. 2

MAGNETOPLASMADYNAMIC THRUSTER WITH REVERSE POLARITY AND TAILORED MASS FLUX

CROSS REFERENCE TO RELATED APPLICATIONS

The present application claims priority to U.S. Provisional Application 63/350,882 filed Jun. 10, 2022. The prior application is incorporated in its entirety by reference.

BACKGROUND OF THE INVENTION

The invention consists of improvements to a plasma accelerator employed as a space propulsion thruster for spacecraft called a Magnetoplasmadynamic (MPD) thruster, first discovered by in 1964. The MPD was first flown in the Space Shuttle in 1996. Several versions of the MPD thruster exist, depending on the operation (pulsed or steady state), the power level (kilowatt or megawatt), the magnetic field (applied by coils or permanent magnets or self-created by the thruster current), the propellant phase (solid, gel, liquid or gas), and the propellant species. Typical propellants are helium, argon, xenon, nitrogen, lithium, ammonia, water, and polytetrafluoroethylene (Teflon).

BRIEF DESCRIPTION OF THE FIGURES

FIG. 2 shows a five-section Rayleigh Line pulse forming network (PFN), the load and capacitor currents.

DETAILED DESCRIPTION OF THE INVENTION

Figure 1A:
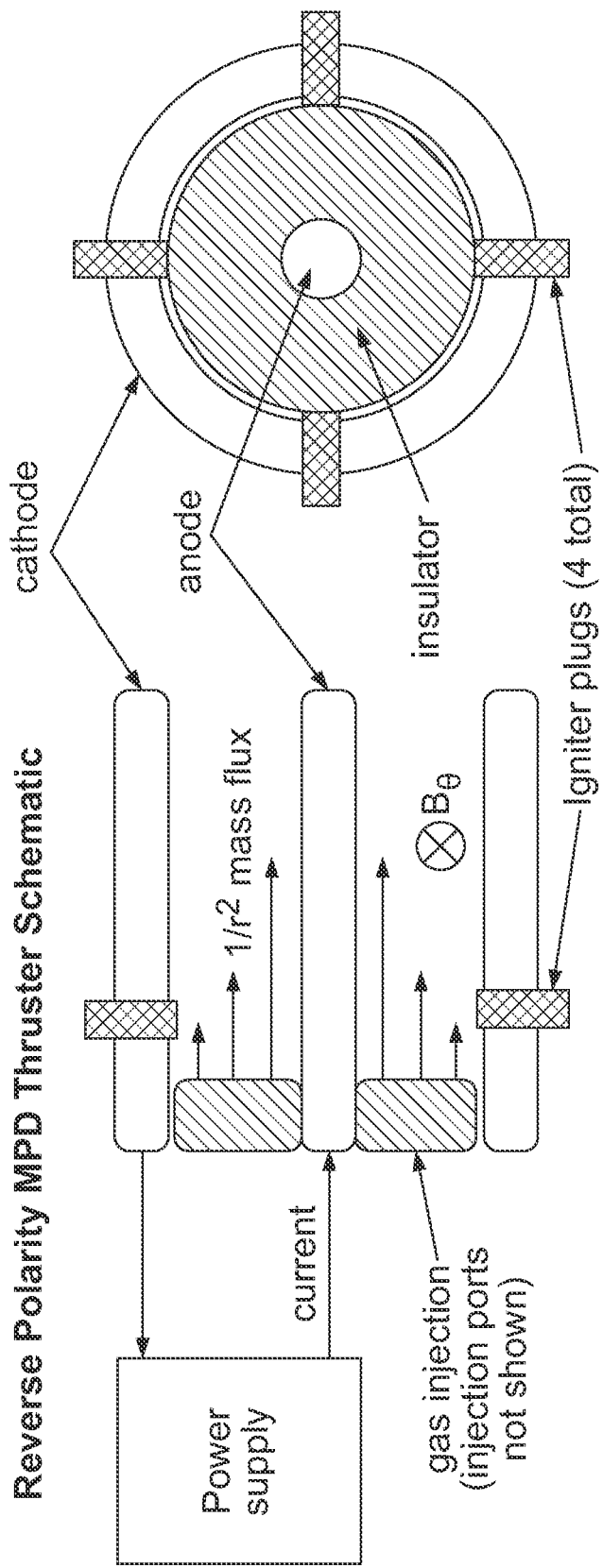
FIGS. 1A and 1B are schematic diagrams of a geometry of the MPD thruster showing a reverse polarity self-field magnetoplasmadynamic thruster with $1/r^2$ mass flux distribution, where 1A is not showing the injector ports, and 1B is showing the injector ports.

The geometry of the MPD thruster (FIGS. 1A and 1B) is coaxial, consisting of a tubular outer electrode and a cylindrical center electrode, separated by an electrical insulator. For gas-fed MPD thrusters the gas is most conveniently fed through passageways called injection ports in the insulator, although feeding gas through the insulator is not a requirement. Once the propellant is flowing between the electrodes and ignited, it is ionized by the electrical current flowing between the electrodes and is then accelerated to achieve thrust.

The MPD thruster creates thrust by accelerating the propellant to high velocity in two ways. The primary method is electromagnetic, using the $\vec{j} \times \vec{B}$ force generated by the interaction of the thruster current density $\vec{j}$ [amperes/m$^2$] with a perpendicular component of the magnetic field $\vec{B}$. The secondary acceleration method, normally less that 10% of the thrust, is electrothermal, achieved by resistively heating the propellant plasma to high temperature and high thermal velocity, allowing the propellant to expand to high velocity into the space vacuum.

The omnivorous propellant nature of the MPD thruster has been well characterized. MPD performance has been measured for a large number of propellants including Ar, $H_2$, $N_2$, $CH_4$, $NH_3$. and Li. An efficiency of 38% has been measured with $N_2$ propellant at Ue=40 km/s. Because favorable results have been achieved with a wide variety of molecular species it is strongly anticipated that this electromagnetic (EM) plasma thruster will operate effectively on mixtures such as the $N_2/O_2$ air mixture characteristic of the thermosphere.

The MPD thruster can be compared to the Gas-Fed Pulsed Plasma Thruster (GFPPT). GFPPT operation can display two fundamental acceleration modes called detonation and deflagration, by analogy with the two similar modes for chemical combustion. In Mode I (a short pulse, large mass bit detonation mode) the discharge forms a moving magnetohydrodynamic shock-like current sheet and the impulse bit is dependent on the mass bit. In Mode II (a short pulse, small mass bit, deflagration mode) the discharge forms a stationary electromagnetic acceleration region and the impulse bit is independent of the mass bit. Deflagration mode is the desired operating mode for the MPD thruster, since the exhaust velocity varies inversely with the mass bit and therefore can be controlled. In addition, the deflagration mode avoids inefficient shock heating of the accelerated gas that results in wasteful thermal losses in the exhaust plume. A fundamental understanding of the basic breakdown process (i.e., discharge initiation, DI) mechanisms in GFPPT has been obtained from a series of experimental and theoretical studies. It was found that DI in GFPPTs, as initiated by several types of spark igniter plugs, can occur through a Townsend breakdown or a streamer breakdown, where the latter is more advantageous for GFPPT performance as it is faster and leads to higher conductivity. Rules for ensuring the occurrence of the latter were derived and verified. While the MPD thruster shares similarities with the GFPPT in terms of deflagration mode and the initial breakdown process, it is distinguished by operating in steady state or by having a much longer current pulse, by achieving constant current and discharge conditions (called steady or quasisteady operation), and the tailoring of the distribution of the injected mass flux.

The present invention first provides for radial tailoring of the propellant mass flux in a novel way. The self-field MPD thruster is predominantly a coaxial electromagnetic device, which means that the current in the device creates an accelerating magnetic pressure. Due to the geometry and the predominantly radial flow of current between the electrodes, the self-magnetic field $B_\theta$, which is in the azimuthal (theta) direction (FIG. 1), decreases with increasing radius away from the centerline as $1/r$, and the magnetic pressure $B^2/2\mu_o$ varies as $1/r^2$. For example, if the radius of the cathode is ten times that of the anode, the magnetic pressure at the outer cathode surface is only 1% ($1/10^2$) that at the inner anode surface.

Part one of this invention is to conform to the $1/r^2$ variation in the magnetic pressure and to provide a similar $1/r^2$ variation in the injected mass flux. By providing a $1/r^2$ variation in mass distribution the supersonic discharge flow is made more uniform and the thruster efficiency is increased. In practice, the $1/r^2$ variation is provided by gas injection ports (FIGS. 1A and 1B) designed to inject more mass close to the central electrode and less mass at large radius, creating a reasonable approximation to a $1/r^2$ variation in mass flux.

Part two of this invention relates to electrode polarity. Historically, the MPD thruster was derived from the electrothermal arcjet, a coaxial device with an outer anode, a central cathode, and propellant injected into the annular gap between the two electrodes. Although hundreds of scientific papers, book chapters, and graduate degree theses have been written about the MPD thruster, none of these publications have discussed experimental or theoretical operation of the MPD thruster with reverse polarity. Reverse polarity simply means that the central electrode is the anode and outer electrode is the cathode, with the current flowing in the positive radial direction from anode to cathode.

Figure 1B:
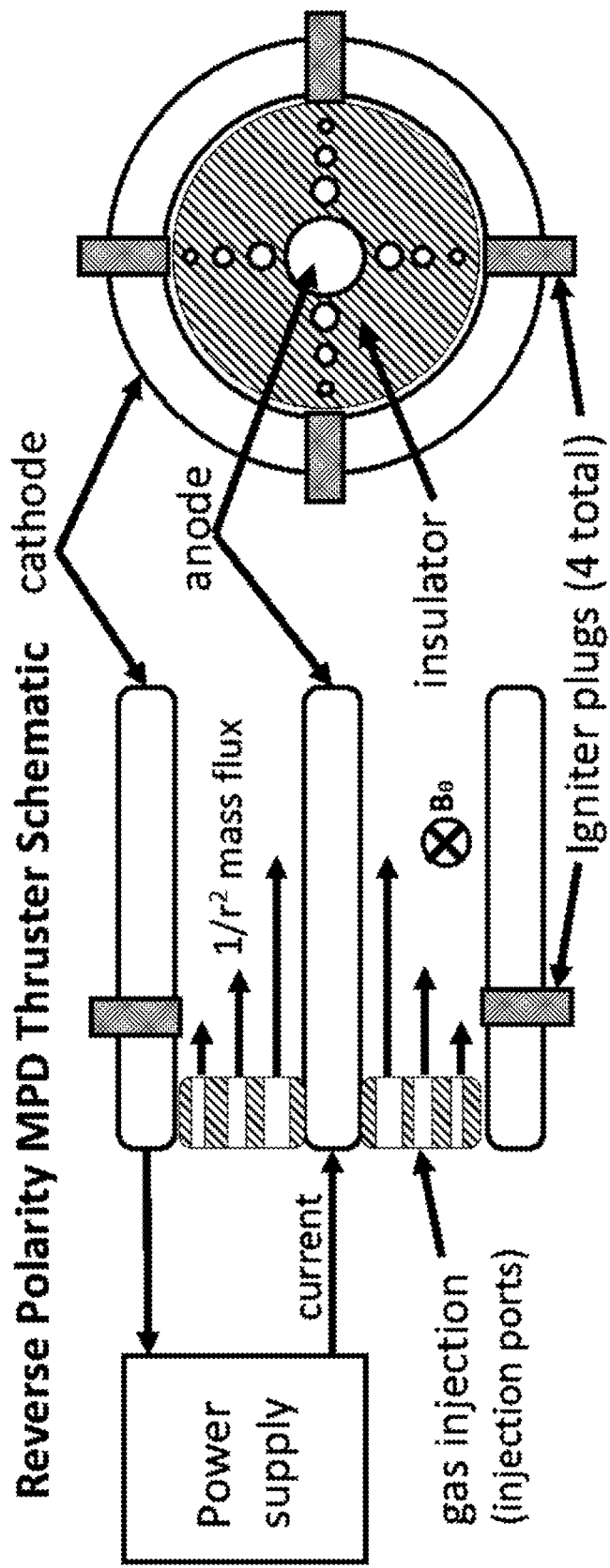

FIGS. 1A and 1B display the primary components of the reverse polarity MPD thruster: current feed, gas injection, igniter plugs, cathode, insulator, anode and azimuthal magnetic field. The device shown is a class of MPD thruster called quasisteady self-field. Without auxiliary magnets, a strong self-magnetic field is created by operating the thruster current at tens of kiloamperes. Because this level of current requires a power level of megawatts to the thruster, and because no practical space-based power supply can supply this power for more than milliseconds, the propellant gas is injected during the pulse by fast-acting valves (not shown in Figures) feeding gas injection ports with a $1/r^2$ mass distribution pattern. With a constant total mass flow rate during a pulse, and by operating the MPDT at constant current during a pulse, as can be provided by a capacitive pulse forming network (PFN), the mode of operation is said to be quasisteady.

Operating the MPD thruster in reverse polarity with a central anode has the following advantages:

Igniter plugs operate by generating clouds of negatively charged electrons which are attracted to the positively charged anode, and in so doing creates a conductive plasma by passing through and ionizing the injected propellant gas. The best location for the plugs to extend their life is in the outer electrode, far from the highly intense central region of the current discharge. Mounting igniter plugs in the outer electrode has been successful in achieving long life in a Teflon thruster called PPT-11 and in a second Teflon thruster called the Fiber-fed Pulsed Plasma Thruster (FPPT). With a central cathode device the plug would have to be mounted in the cathode, which would shorten plug life considerably.

Coaxial electric thrusters find it convenient, and safe, to connect the outer electrode to electrical ground. With a central anode at high voltage the igniters are mounted in the grounded outer electrode, simplifying the mounting and electrical circuit for the plugs.

A central anode improves the plasma ion flow out of the thruster. As a gas particle is ionized it attains a positive charge, and is accelerated in the direction of the positive electric field. With a central anode the positive electric field between the electrodes is directed radially outward, away from the central anode. A newly created ion will therefore be accelerated away from the electrode and will continue unimpeded out of the thruster. With a central cathode, however, ions created close to the cathode surface are attracted to the cathode by the electric field, will collide with the surface, and do not contribute their momentum to thrust.

The MPD thruster operated at high current can develop terminal voltage oscillations accompanied by erosion of the anode. These oscillations and erosion are mitigated by providing extra ions near the anode, and this is accomplished directly with a central anode operating in the region of highest mass flux due to the $1/r^2$ mass flux distribution.

The thruster impedance of 10-20 milliohms requires 1-2 MW of power at 5-10 kA, supplied by a pulse forming network (PFN), a lumped network of capacitors and inductances with an impedance matching that of the discharge to transfer the stored energy in a single unidirectional pulse. PFNs are a well-understood technology first used with EM plasma accelerators in the 1960s. A typical PFN impedance-matched to the thruster requires a bank voltage of 400 V to generate a discharge current of 10 kA. Under these quasi-steady conditions with no current reversal, the duration of the current pulse is given by $t_p=Q/I=2CZp$, where Q is the stored charge on the bank, C is the total bank capacitance, and Zp is the impedance of the PFN in ohms.

The MPD thruster does not require a switch, because the thruster electrodes are vacuum-insulated during the PFN charging phase. It is possible to initiate the current pulse in several ways: through Paschen breakdown by air injection into the electrode gap, by igniter plugs in the thruster cathode that generate electrons, or by inductive or laser methods. CUA has developed igniter plugs for the FPPT thruster with an estimated lifetime of $>10^7$ pulses (3.0 years at 0.1 Hz) based upon erosion data, and multiple plugs can be used to extend system life.

A PFN circuit diagram for a "Rayleigh Line" PFN with N=5 sections is shown in FIG. 2. Capacitive sections Cn are connected by an inductance Ln, chosen so that the impedance $Zp=\sqrt{L_n/C_n}$ matches the thruster impedance Z, determined experimentally. The pulse length is then $t_p=2N\sqrt{L_nC_n}$, and $t_p$ is several 100 microseconds depending on Ue. The number of sections N is typically 5<N<10. The capacitors are chosen for high reliability and are charged to ~80% of rated voltage to meet system life requirements.

CUA has successfully operated the FPPT with multi-layer ceramic (MLC) capacitors for 32 joule pulses at 20 kA, with a mounted specific energy of 45 J/kg and a tested life by CUA of $>10^9$ pulses. Because use of the MLC capacitors for this MPD PFN would require $>10^4$ units, other capacitor types such as film and oil-filled capacitors are being evaluated to reliably provide the hundreds or thousands of joules required in the MPD PFN. For example, a derated NWL, Inc. 120 μF, 500 V film capacitor would require approximately only 50 units to store 500 J at the same specific energy.

We claim:

1. An electromagnetic plasma accelerator used as a space thruster operating in a gaseous propellant-injected steady or quasisteady pulse mode comprising:

a cylindrical discharge chamber of length sufficient to contain the discharge, formed by a central metal anode with a high positive voltage, a cylindrical outer cathode at a lower voltage than the anode coaxial with the central electrode, the cylindrical discharge chamber being closed at one end by an electrical insulator radially between the cylindrical outer cathode and the central electrode, and a gaseous propellant fed axially through ports at different radial locations formed in the electrical insulator, and wherein the ports are configured to inject more gas closer to the central electrode with a radial distribution of mass flux that approximates the inverse square of a radius $1/r^2$, and the cylindrical discharge chamber being open at an opposite end to allow an accelerated propellant to exit at high velocity to create thrust, such that the primary direction of current is radially outward, and wherein a magnitude of the current is sufficiently high that the azimuthal magnetic B field created by a radial current combines with the radial current to accelerate an ionized plasma created by the current predominantly by electromagnetic forces in the predominantly axial direction with a smaller component in the outward radial direction.

2. The plasma accelerator of claim 1, wherein the propellant is a monatomic gas such as helium, argon or xenon, a diatomic gas such as hydrogen, nitrogen, or oxygen, a polyatomic gas such as ammonia or sulfur dioxide, a hydrofluorocarbon gas such as tetrafluoroethane (R134) or hexafluoropropane (R236fa), an evaporated metal gas such as lithium, an evaporated polymer gas such as polytetrafluoroethylene or any mixture of these categories of gases.

3. The plasma accelerator of claim 2, wherein the discharge is initiated by one or more igniter plugs located in the coaxial cathode which when high positive voltage is created on the anode and the igniter is pulsed to create a plasma at the tip of the plug, the electrons from the plasma then are accelerated in a radial electric field between the anode and cathode such that the electrons gain enough energy to ionize the injected propellant and create an initial conducting path for high current to flow from the anode to the cathode.

4. The plasma accelerator of claim 3, wherein the central anode is tapered so that the smallest diameter is closest to the exit of the discharge chamber and the coaxial cathode is flared so that the maximum diameter is at the exit of the discharge chamber.

5. An electromagnetic accelerator comprising,
a cold gas propellant, a steady or quasisteady pulse mode configured to operate at a sufficient level of power that a large fraction of the injected cold gas is dissociated into atoms and ionized into ions and electrons by a current to create a fully ionized or nearly fully ionized plasma inside a cylindrical discharge chamber formed by a central metal anode and a cylindrical outer cathode at a lower voltage than the anode coaxial with the central electrode, wherein a magnitude of the current is sufficiently high that the azimuthal magnetic B field created by a radial current combines with the radial current to accelerate the plasma created by the current predominantly by electromagnetic forces in the predominantly axial direction with a smaller component in an outward radial direction and wherein the cold gas propellant is fed axially through ports in an electrical insulator that is radially between the cylindrical outer cathode and the central electrode, the ports located at different radial distances in the electrical insulator to generate a radial distribution of mass flux that approximates the inverse square of the radius $1/r^2$.

6. The electromagnetic accelerator of claim 5, wherein the cold gas propellant is a monatomic gas such as helium, argon or xenon, a diatomic gas such as hydrogen, nitrogen, or oxygen, a polyatomic gas such as ammonia or sulfur dioxide, a hydrofluorocarbon gas such as tetrafluoroethane (R134) or hexafluoropropane (R236fa), an evaporated metal gas such as lithium, an evaporated polymer gas such as polytetrafluoroethylene or any mixture of these categories of gases.

7. The electromagnetic accelerator of claim 6, wherein the discharge is initiated by one or more igniter plugs located in the coaxial cathode which when high positive voltage is created on the anode and the igniter is pulsed to create a plasma at the tip of the plug, the electrons from the plasma then are accelerated in a radial electric field between the anode and cathode such that the electrons gain enough energy to ionize the injected cold gas propellant and create an initial conducting path for high current to flow from the anode to the cathode.

8. The electromagnetic accelerator of claim 7, wherein the central anode is tapered so that a smallest diameter is closest to an exit of the discharge chamber and the coaxial cathode is flared so that a maximum diameter is at the exit of the discharge chamber.

* * * * *